United States Patent [19]

Mendonsa et al.

[11] Patent Number: 4,695,022
[45] Date of Patent: Sep. 22, 1987

[54] CLARINET STAND

[76] Inventors: Alvin A. Mendonsa, 2860 Ransford Ave., Monterey, Calif. 93940; Donald D. Eshoff, 87 San Benancio Rd., Salinas, Calif. 93908

[21] Appl. No.: 612,350

[22] Filed: May 21, 1984

[51] Int. Cl.$^4$ ............................................. F16M 11/00
[52] U.S. Cl. .................................... 248/176; 248/170; 84/387 A; 206/314
[58] Field of Search ................. 248/176, 188.6, 188.1, 248/166, 168, 170, 528, 173, 150, 151, 525, 529, 309.2, 460, 443, 188.7; 84/385 A, 385 B, 387 A, 453, 421; 306/314

[56] References Cited

U.S. PATENT DOCUMENTS

| | | | |
|---|---|---|---|
| 1,863,756 | 6/1932 | Lufkin | 248/188.6 X |
| 2,750,138 | 6/1956 | Morris | 248/528 |
| 2,901,860 | 9/1959 | Crawford | 84/387 A |
| 2,920,851 | 1/1960 | Carlini | 84/387 A |
| 2,940,708 | 6/1960 | Grimal | 248/168 |
| 3,167,291 | 1/1965 | Maguire | 248/188.1 |
| 3,357,666 | 12/1967 | Smith et al. | 84/453 |
| 3,804,355 | 4/1974 | Uroshevich | 248/170 |
| 4,161,131 | 7/1979 | Blayman | 84/453 |
| 4,407,182 | 10/1983 | Biasini | 248/176 |

Primary Examiner—Ramon O. Ramirez
Attorney, Agent, or Firm—Schroeder, Davis & Orliss, Inc.

[57] ABSTRACT

A clarinet stand made of semi-flexible plastic, constructed in such a way that there are no loose parts to assemble. Said stand, because of a unique, riveted spring action of the legs, makes possible the folding and unfolding of said legs in a matter of seconds. With legs folded, the units size and shape is comparable to that of the contour of the clarinet bell interior thus creating a unit that may be packed and stored in said bell while the clarinet is in the case. With the legs unfolded, the unit becomes a lightweight, durable stand which will hold the instrument securely, in a vertical position, when not in the player's hands.

12 Claims, 10 Drawing Figures

CLARINET STAND

BACKGROUND OF THE INVENTION

1. Field of Invention

This invention relates generally to musical instruments and more specifically to accessories used to hold or support the clarinet.

2. Description of Prior Art

Heretofore, it has been generally accepted that the player of the more common Bb soprano clarinet had no need for a stand for his instrument unless he doubled on the saxophone, in which case a saxophone stand was used that might include a stationary peg attachment for use with the clarinet. These pegs, also used for flute and oboe need to be assembled on the saxophone stand and do not fit in the instrument case. The player who plays only clarinet sometimes uses a stationary, peg-type stand mounted on a block or on removeable metal legs. Most players, however, are reluctant to carry this extra equipment as it does not fit in the case, is inconvenient and involves separate parts to carry and assemble. The result is that the player will most often not use a stand and during an interruption of playing will set the clarinet on the music stand, floor or in some other manner that might result in damage to the instrument.

It would be desirable, therefore, to provide a clarinet stand which would be light, practical and durable that could be carried and stored in the clarinet case when not in use, a stand that requires no assembly of separate parts, a stand that requires no extra space and is carried conveniently with the clarinet at all times, and a stand that holds the instrument securely when not in use.

SUMMARY OF THE INVENTION

Accordingly, it is an object of this invention to provide a clarinet stand that is light, practical and durable.

It is another object of this invention to provide a clarinet stand that is a one piece unit with no loose parts to assemble and that unfolds and folds conveniently in a matter of seconds.

Still another object of this invention is to provide a clarinet stand that folds into a unit that can be stored in the bell of the clarinet while said clarinet is packed in the case.

Yet another object of the invention is to provide a clarinet stand made of strong but flexible plastic material that holds the instrument securely without being harmful to the bell of the clarinet.

These and other objects have now been attained by providing a simple, light, inexpensive, practical and durable clarinet stand made of a semi-flexible plastic which will not damage the clarinet bell. The stand is constructed in such a way that the unique spring action of the legs makes possible the folding and unfolding of said legs in a matter of seconds with no loose parts to assemble. The clarinet stand folds into a unit comparable to the contour of the inside of the clarinet bell thus creating a unit that may be stored and packed in said bell while the clarinet is in its case, thereby becoming an integral part of the clarinet "outfit".

The several features of this invention will become more readily apparent from the following description taken in conjunction with the accompanying drawings.

BRIEF DESCRIPTION OF THE INVENTION

DETAILED DESCRIPTION OF THE INVENTION

Figure 1:
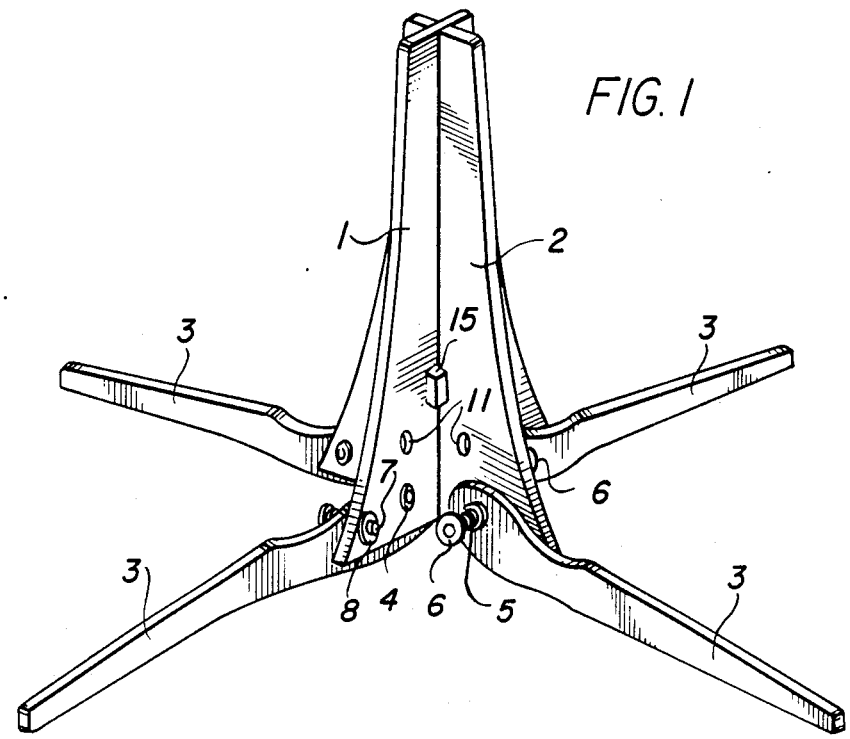
FIG. 1 is a perspective view of the clarinet stand in its open position with legs unfolded.

Referring more particularly to the drawings, the stand is formed of six major parts, two bell shaped flat panels, parts 1 and 2 and four legs, parts 3, made of durable and somewhat flexible plastic material. By intersecting the two panels 1 and 2 a four edged bell is formed creating a shape consistent with the contour of a clarinet bell interior. The procedure of locking the two panels into place will be discussed in detail in future paragraphs.

The two relatively thin panels are perpendicular to each other forming four 90 degree right angle spaces producing sufficient area for the placement of said legs and hardware, namely the rivet 4, the spring 5, and washer, 6.

Figure 2:
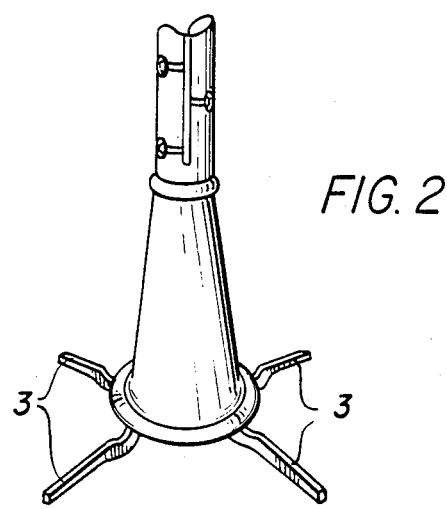
FIG. 2 is a perspective view of the stand when in use with a clarinet.

Each leg is supplied with a cylindrical nipple 7, slightly smaller than a panel hole 8. Spring pressure against the leg, locks said nipple into said hole and stabilizes the leg. It was found that a depression in each leg coinciding with the outer circumference of the clarinet bell enables the clarinet to set more comfortably on the stand with a minimum of play as illustrated in FIG. 2.

Figure 3:
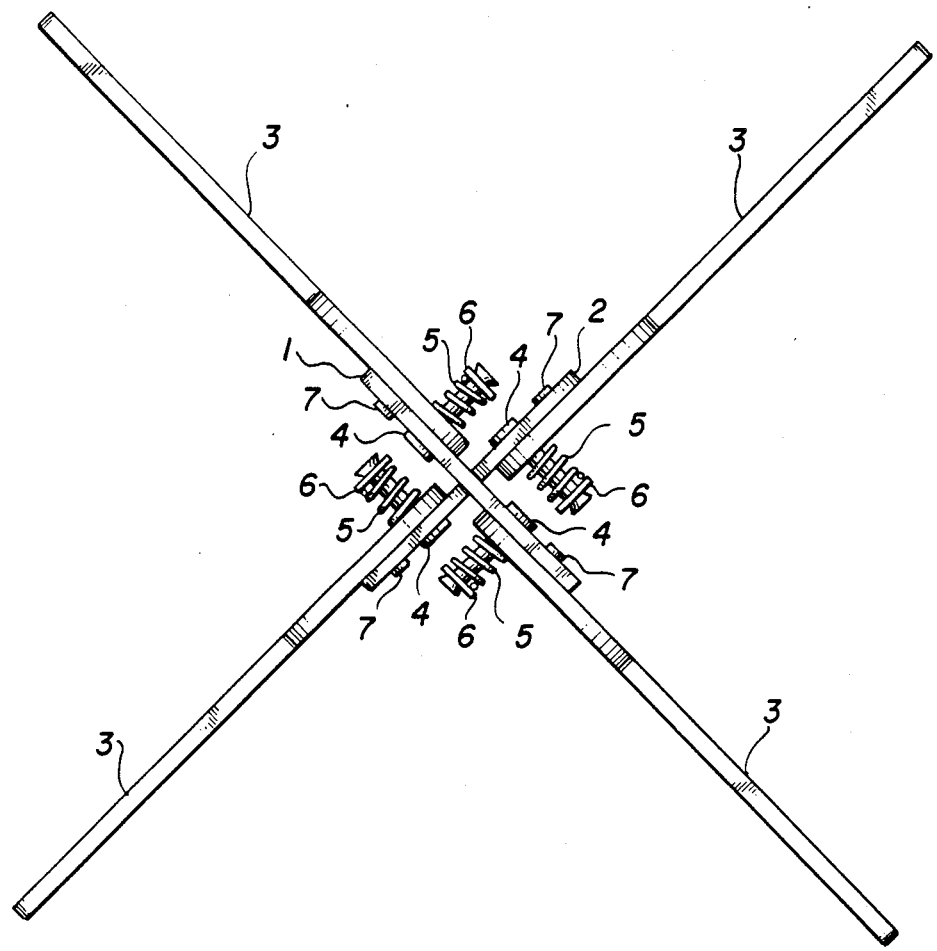
FIG. 3 is a top view of the stand showing position of legs.

Placement and attachment of legs in relationship to panels may better be understood from an above view, FIG. 3.

Figure 4:
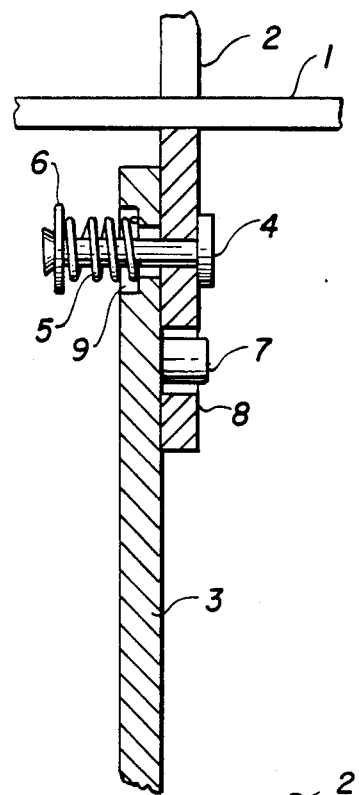
FIG. 4 is an enlarged top view sectional of a leg in locked position.
Figure 5:
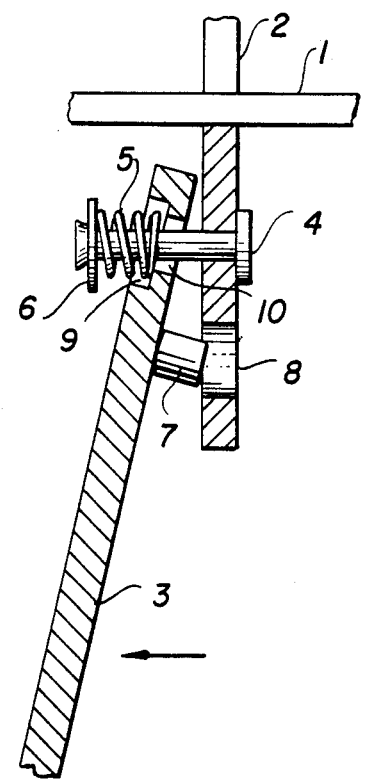
FIG. 5 is an enlarged top view of a leg in release position.
Figure 6:
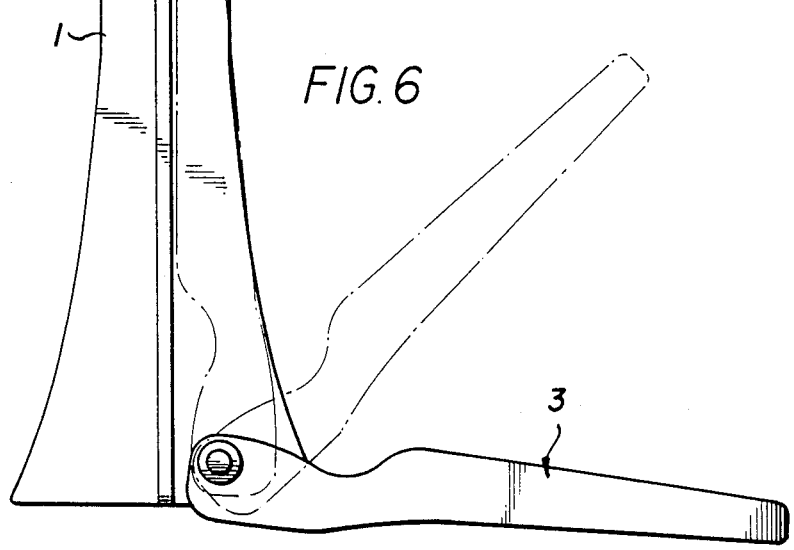
FIG. 6 is a side view of stand showing movement of leg from opened to closed position in a superimposed illustration.

As shown in FIG. 4, at the axis of each leg, a bore 9 is cut to the exact size of the spring 5, holding said spring better in place. A hollow rivet 4, acting as the axis and expanded in a conventional manner at the tip, secures the washer 6, against said spring. Other conventional methods for holding the spring in place could be used. Leg hole 10 continuing from bore 9 is slightly larger in diameter than that of said axle thus creating some intentional play so that, as shown in FIG. 5, when a lateral movement of the leg, 3, from the panel 2, is made, the leg nipple 7, is released from hole 8. Said leg can therefore move upward as in FIG. 6 with leg nipple 7 locking into place in hole 11 creating a closed or folded position. The opposite procedure is therefore used to create the open position.

Figure 7:
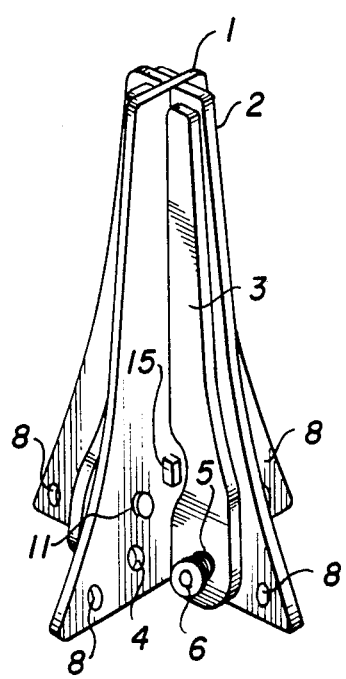
FIG. 7 is a perspective view of stand in folded position.
Figure 8:
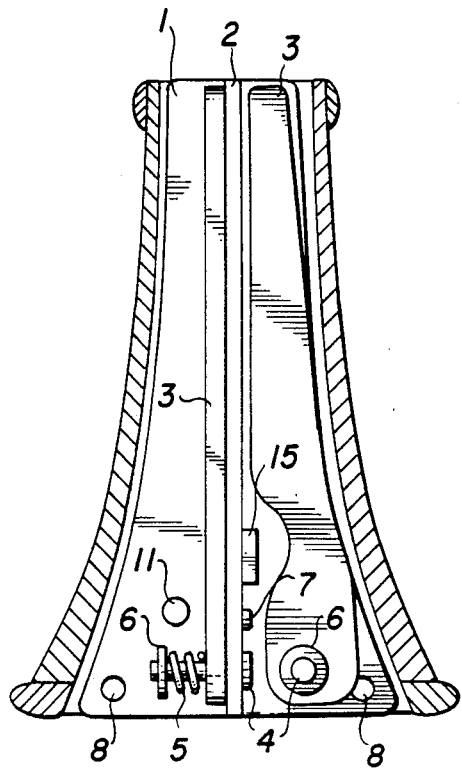
FIG. 8 is a section view of clarinet bell showing position of folded stand.
Figure 9:
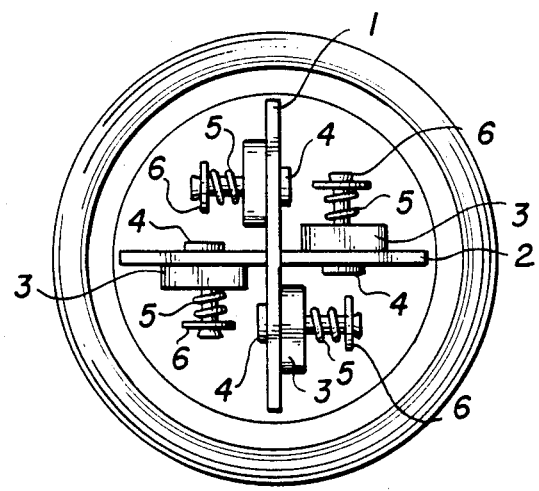
FIG. 9 is a bottom view of folded stand in clarinet bell.

The completely folded stand, FIG. 7, is dimensioned to fit into clarinet bell as shown in FIG. 8 and FIG. 9 for easy storage in a clarinet case.

Dimensions of the stand are such that it may fit into any known size bell, considering that all clarinet bells are not of like dimensions.

Figure 10:
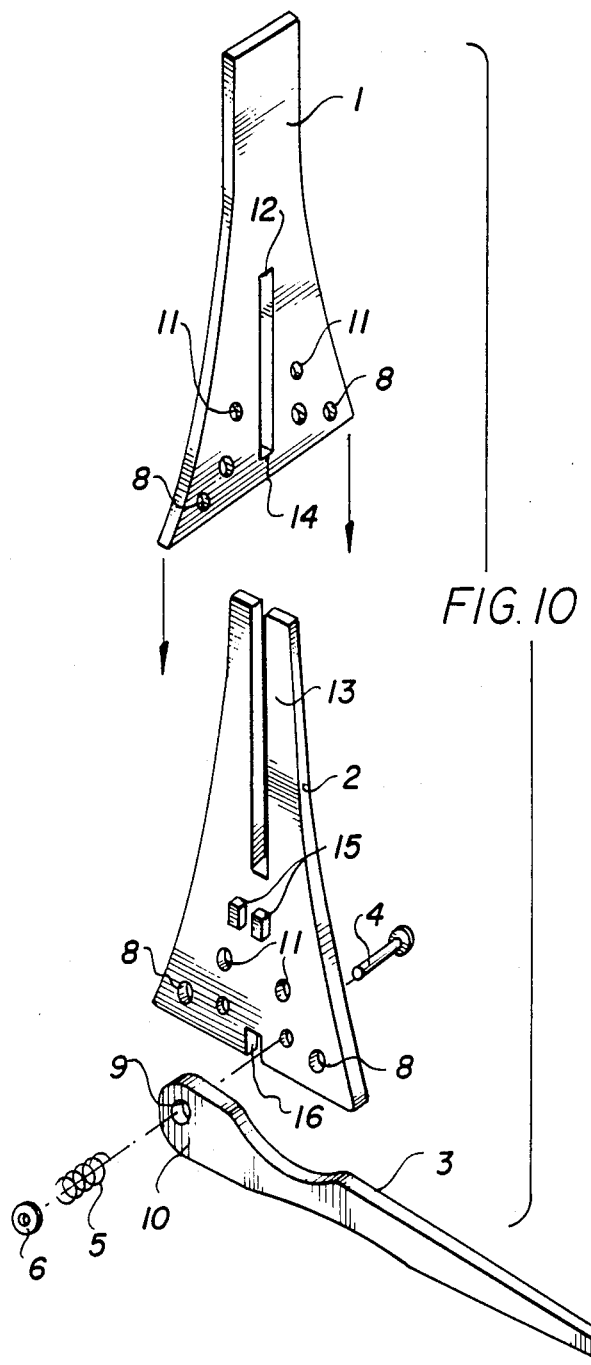
FIG. 10 is an exploded view of stand.

Important to the invention is the manner in which the two panels are assembled. In FIG. 10, bottom half slot 12 of panel 1 slips through top slot 13 of panel 2. To make this possible, a hairline slit 14 at the bottom of the slot 12 must be expanded sufficiently to allow panel 1 to slip over the bottom half of panel 2 through stabilizer bars 15 and received by slot 16 of panel 2, slit 14 contracts and thus locks the panels into place so that gluing or any other conventional method of holding said panels together is unnecessary. Such procedure for assembling panels can only be possible with the use of semi-flexible plastic.

Stabilizer bars 15 on both sides of panel 1 are essential to prevent lateral movement of panels when folding or unfolding legs.

The use of two panels is preferred to a possible one piece molded construction because it facilitates the assembly of the legs to the panels before said panels are slotted together. Such construction also creates a less expensive unit.

The above described preferred embodiment is intended to be illustrative of the invention which may be modified within the scope of the appended claims.

We claim:

1. A stand for supporting musical instruments which have a bell, said stand having an open configuration for supporting said instruments and a closed configuration for storing and transporting within said instruments, said stand comprising:
   a support portion having an outside contour which substantially conforms to the inside contour of the bell of said instruments, and having a plurality of cavities formed within the outside contour thereof; and
   a plurality of legs, movably coupled to the support portion, having a lockably open position to form the open configuration of the stand, and a lockably closed position to form the closed configuration of the stand, said legs being formed to fit within said cavities of the support portion;
   said cavities being arranged to receive said legs in said closed configuration.

2. A stand in claim 1 wherein said legs are contoured to accept the aperture of the bell of the instrument when said legs are locked in the open position.

3. A stand as in claim 1 wherein said stand fits substantially within the bell of said instruments when in the closed configuration.

4. A stand as in claim 1 wherein said stand supports said instruments in a substantially vertical position when in open configuration.

5. A stand as in claim 1 wherein the support portion is constructed of at least two planer panels each having a thickness dimension substantially less than its width or length dimensions, a peripheral contour substantially conforming to the inside contour of the bell of said instruments, and a longitudinal axis.

6. A stand as in claim 5 wherein:
   said panels are constructed of flexible material; a first one of said panels includes a slot along its longitudinal axis extending from the narrowest end of said first panel to approximately the center thereof, and a notch disposed on the longitudinal axis at the widest end of said panel; and
   a second one of said panels includes a slot along its longitudinal axis extending from approximately the center of said second panel to a point near the widest end thereof;
   said slots in said panels having a width dimension approximately equal to the thickness dimension of said panels;
   said second panel having a narrow slot extending from the end of the slot at the point near the widest end of said second panel to the widest end thereof to provide an engagable panel portion for engaging said notch of said first panel when said first and second panels are orthogonally assembled along their respective longitudinal axes.

7. A stand as in claim 6 wherein at least one of said panels includes protrusions disposed on either side of said slot for stabilizing said assembled panels.

8. A stand as in claim 6 further including fastening means having spring-tension means for coupling said legs to said panels.

9. A stand as in claim 6 further including locking means means for locking said legs into said open and said closed positions.

10. A stand as in claim 9 wherein said locking means comprise a protrusion extending from each leg and holes in said panels suitably arranged to cooperatively engage said leg protrusion in said open and said closed position of the legs.

11. A stand as in claim 8 wherein said spring-tension means stabilizes said legs in said open position.

12. A stand as in claim 1 wherein the musical instruments are selected from a group consisting of instruments having a longitudinal axis and a bell at one end thereof including a clarinet.

* * * * *